(12) United States Patent
Geiner et al.

(10) Patent No.: US 9,092,558 B2
(45) Date of Patent: Jul. 28, 2015

(54) GROUPING FREQUENTLY REFERENCED DATA ITEMS TO CO-LOCATE FOR CACHE UTILIZATION

(75) Inventors: Robert V. Geiner, Raleigh, NC (US); Matt R. Hogstrom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 3493 days.

(21) Appl. No.: 10/818,072

(22) Filed: Apr. 5, 2004

(65) Prior Publication Data

US 2005/0223028 A1 Oct. 6, 2005

(51) Int. Cl.
*G06F 11/34* (2006.01)
*G06F 9/45* (2006.01)

(52) U.S. Cl.
CPC .......... *G06F 11/3457* (2013.01); *G06F 8/4442* (2013.01); *G06F 11/3471* (2013.01); *G06F 11/3476* (2013.01); *G06F 2201/88* (2013.01)

(58) Field of Classification Search
USPC ........................................................ 707/100
See application file for complete search history.

(56) References Cited

U.S. PATENT DOCUMENTS

| 6,321,240 | B1 | 11/2001 | Chilimbi et al. |
| 6,330,556 | B1 | 12/2001 | Chilimbi et al. |
| 6,360,361 | B1 | 3/2002 | Larus et al. |
| 6,453,319 | B1 * | 9/2002 | Mattis et al. ........................... 1/1 |
| 6,480,862 | B1 | 11/2002 | Gall |
| 6,594,678 | B1 | 7/2003 | Stoutamire et al. |
| 2002/0073405 | A1 | 6/2002 | Chilimbi |
| 2002/0087563 | A1 * | 7/2002 | Ghemawat et al. ........... 707/100 |
| 2003/0120866 | A1 | 6/2003 | Stoutamire |

OTHER PUBLICATIONS

Hwu, W. and P. Chang, "Achieving High Instruction Cache Performance With and Optimizing Compiler", Proc. 16th Ann. Int'l. Symp. On Computer Architecture, pp. 242-251, Jun. 1989.*
Hall, M.W. and Ken Kennedy, "Efficient Call Graph Analysis," ACM Letters on Programming Languages and Systems, vol. 1, No. 3, Sep. 1992, pp. 227-242.*

* cited by examiner

*Primary Examiner* — Christyann Pulliam
*Assistant Examiner* — Charles Adams
(74) *Attorney, Agent, or Firm* — Steven M. Greenberg, Esq.; CRGO Law

(57) ABSTRACT

A method, system and apparatus for configuring programmatic objects for cache co-location. The method can include the steps of counting a frequency of access for individual fields in the object in a static analysis, rearranging the fields in the object based upon the counted frequency in the static analysis, and executing the object. Subsequently, a frequency of access for the individual fields in the object further can be counted in a dynamic analysis. Consequently, the fields in the object can be further rearranged based upon the counted frequency in the dynamic analysis to produce an optimal grouping for placement in cache memory. In a preferred aspect of the invention, access types for the individual fields can be identified. Subsequently, the rearranging step and the further rearranging step can be performed based both upon the counted frequency and also upon the access types.

12 Claims, 3 Drawing Sheets

GROUPING FREQUENTLY REFERENCED DATA ITEMS TO CO-LOCATE FOR CACHE UTILIZATION

BACKGROUND OF THE INVENTION

1. Statement of the Technical Field

The present invention relates to caching systems, and more particularly to the grouping of object data to achieve caching improvements.

2. Description of the Related Art

Cache memory has become an important structural and programmatic element as a supplement to main memory in a computing system. Cache memory, which typically enjoys enhanced access times when compared to main memory, often is configured to store frequently accessed data items from main memory. When a request is received in the computing system to retrieve data items, the cache can be consulted first to determine whether the requested data item can be retrieved from the cache without requiring a more resource expensive retrieval from main memory. In this way, the proper population of cache memory with data items can produce substantial gains in computing performance.

Careful management of cache memory can be essential to the optimal retrieval of data in a computing system. Though many cache population and replacement methodologies have been implemented through the years, most share the component of determining which data items are most frequently accessed in main memory and ensuring that those most frequently accessed data items are placed in cache memory rather than main memory. Additionally, many conventional caching methodologies co-locate data items in a cache to ensure that related data items are positioned most closely together. In this way, it is more likely that related data items can be retrieved from cache memory quickly in a single cache block.

As an example, in U.S. Pat. No. 6,330,556 to Chilimbi et al., hereinafter, "Chilimbi", fields within addressable data elements in data structures can be re-ordered to improve the efficiency of cache line access. Specifically, data structures such as a class can be partitioned into heavily referenced and less heavily referenced portions. The partitioning can be based upon profile information regarding field access counts with indirect addressing used to reference the less heavily referenced partitioned class. A class co-location scheme subsequently can be used to ensure that temporally correlated classes are placed near each other in cache blocks.

Similarly, in U.S. Pat. No. 6,360,361 to Larus et al., hereinafter, "Larus", fields which are individually addressable data elements in data structures can be reordered to improve the efficiency of cache line access. Temporal data regarding the referencing of such fields can be obtained and a tool can be used to construct a field affinity graph of temporal access affinities between the fields. A first pass greedy algorithm thus can be used in processing the affinity graph to combine high affinity fields in the same cache line or block. Finally, in U.S. Pat. No. 6,594,678 to Stoutamire et al., hereinafter "Stoutamire", objects in memory can be re-arranged according to the frequency of access in memory of one or more fields associated with the object.

In each of Chilimbi, Larus and Stoutamire, the frequency of access of data fields has been established as the sole criteria for determining which data fields to co-locate within one another in cache memory. While substantial performance improvements can be realized from the methodologies of Chilimbi, Larus and Stoutamire, the efficiencies of each are achieved solely through co-locating data fields based upon a single criteria—access count—identified though a single analysis. Oftentimes, however, a one-time analysis of object code based upon a single criteria for configuring the object code for cache co-location can fail to achieve an optimal result. Consequently, to limit the co-location of data fields based upon a single criterion in a single analysis, whether static or dynamic, can result in a less than optimal arrangement.

SUMMARY OF THE INVENTION

The present invention addresses the deficiencies of the art in respect to cache data co-location and provides a novel and non-obvious method, system and apparatus for configuring programmatic objects for cache co-location. In accordance with the present invention, a method for grouping data fields in an object for optimal cache co-location can include the steps of counting a frequency of access for individual fields in the object in a static analysis, rearranging the fields in the object based upon the counted frequency in the static analysis, and executing the object. Subsequently, a frequency of access for the individual fields in the object further can be counted in a dynamic analysis. Consequently, the fields in the object can be further rearranged based upon the counted frequency in the dynamic analysis to produce an optimal grouping for placement in cache memory.

In a preferred aspect of the invention, access types for the individual fields can be identified in the static analysis. For instance, the access types can include attempts to read data from the fields, or attempts to update data in the fields, to name a few. Subsequently, the rearranging step can be performed based both upon the counted frequency in the static analysis and also upon the access types in the static analysis. Similarly, access types for the individual fields can be identified in the dynamic analysis. As such, the further rearranging step can be performed based both upon the counted frequency in the dynamic analysis and also upon the access types in the dynamic analysis.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for grouping frequently referenced data items in an object to co-locate for cache utilization improvements. In accordance with the present invention, a multi-pass object analysis can be performed to identify object performance characteristics based upon one or more performance criteria. In a preferred aspect of the invention, the criteria can include not only an access count for the fields of an object, but also an access type, for example "read" access or "update" access to name a few. The analysis can be performed both statically prior to execution, and dynamically during execution. Responsive to the analyses, the grouping of fields in the object can be sorted according to the criteria and the analysis. In this way, the placement of the fields in the cache can be optimized.

Figure 1:
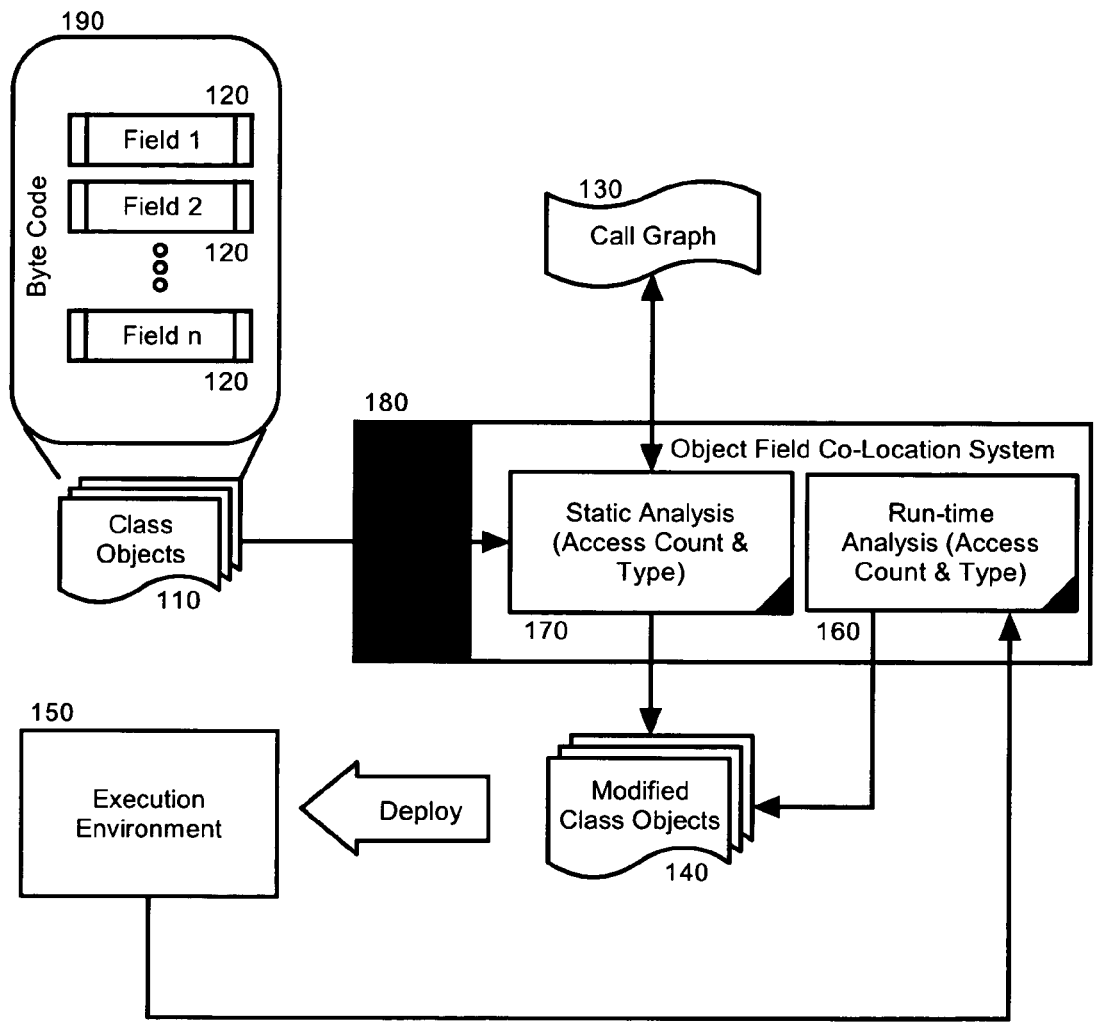
FIG. 1 is a schematic illustration of an object tuning system configured for cache co-location in accordance with the present invention.

In further illustration of the foregoing invention, FIG. 1 is a schematic illustration of an object tuning system configured for cache co-location in accordance with the present invention. The object tuning system can include an object field co-location system 180 configured to process the compiled code of a programmatic object. As shown in FIG. 1, the compiled code can include the byte code 190 of class objects 110. Each class object 110 processed by the object field co-location system 180 can include one or more fields 120 identifiable in the byte code 190. Notably, the fields 120 can be arbitrarily ordered as is the case in conventionally known compiled objects.

The object field co-location system 180 can include dual analysis processes: a static analysis processor 170 and a run-time analysis processor 160. The static analysis processor 170 can be programmed to generate a call graph 130 based upon references to the fields 120 of the byte code 190 of each class object 110. The references can be identified both internally to a single one of the class objects 110, and externally from other ones of the class objects 110. In either case, using the call graph 130, the static analysis processor 170 can compute a number of times each of the fields 120 is accessed. Additionally, the static analysis processor 170 can determine the type of access performed in each instance for each of the fields 120.

The run-time analysis processor 160, like the static analysis processor 170, can be programmed to identify references to the fields 120 of the byte code 190 of each class object 110 during execution in an execution environment 150, for example when the byte code 190 is interpreted in a virtual machine. Also, in the run-time analysis processor 160, the references can be identified without regard to the source of the reference. As in the case of the static analysis processor 170, however, the run-time analysis processor 160 both can compute a number of times each of the fields 120 is accessed and also the type of access performed in each instance for each of the fields 120. Notably, to facilitate the identification and computation of field access events, the class objects 110 can be instrumented prior to execution as is well-known in the art.

In both the case of the static analysis processor 170 and the run-time analysis processor 160, a modified form 140 of the class objects can be produced to encourage an optimal grouping of the fields 120 in cache memory. For instance, the data fields in the byte code 190 can be sorted in the modified form 140 according to the number of times each of the fields 120 is accessed. Those of the fields 120 which are accessed more frequently are grouped together. Also, the fields 120 can be sorted first on access type, for instance whether the fields 120 are accessed for a "read" operation, or for an "update" operation. Within the type sorting, the fields 120 can be sorted on access count. Importantly, by implementing a dual sort, an optimal co-location can be achieved in cache memory beyond that which is possible using a single criteria. Furthermore, by implementing a multi-pass analysis (both static and run-time), an optimal co-location can be achieved in cache memory beyond that which is possible using a single pass analysis.

Figure 2:
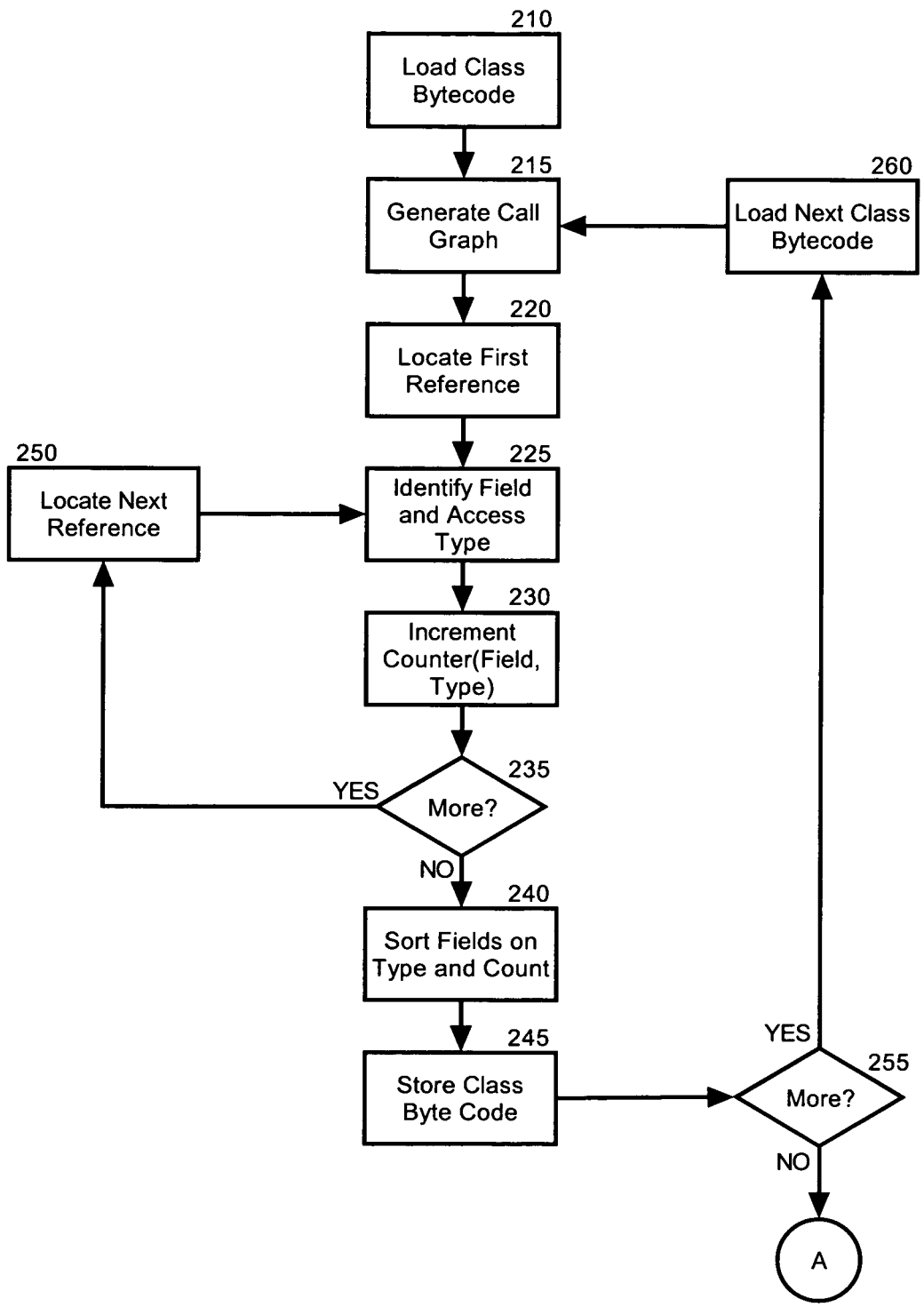
FIG. 2 is a flow chart illustrating a process for statically analyzing and re-configuring an object for cache co-location in the system of FIG. 1; and, FIG. 3 is a flow chart illustrating a process for dynamically analyzing and re-configuring an object for cache co-location in the system of FIG. 1.

In further illustration of the operation of object field co-location system 180, FIG. 2 is a flow chart illustrating a process for statically analyzing and re-configuring an object for cache co-location. Beginning in block 210, the byte code of a class can be loaded and a call graph can be generated in block 215. In block 220, the first field reference in the call graph can be located and in block 225 the field and the access type can be identified. In block 230, a counter can be incremented for the field and the access type for the field can be noted, as well. If in decision block 235, additional references remain to be processed in the call graph, in block 250 the next reference in the call graph can be located and the process can repeat in blocks 225 through 235.

When no more references remain to be processed in the call graph, in block 240 the fields can be sorted first on access type and subsequently on count. Using the sorted grouping of fields, in block 245 the class byte code can be rearranged to incorporate the new sorting of fields thus completing the static processing for the class byte code. In decision block 255, if additional classes remain to be processed, the next class byte code can be loaded in block 260 and the process can repeat in blocks 215 through 255. Once all of the classes have been processed, a dynamic analysis process can be performed through jump circle A.

Figure 3:
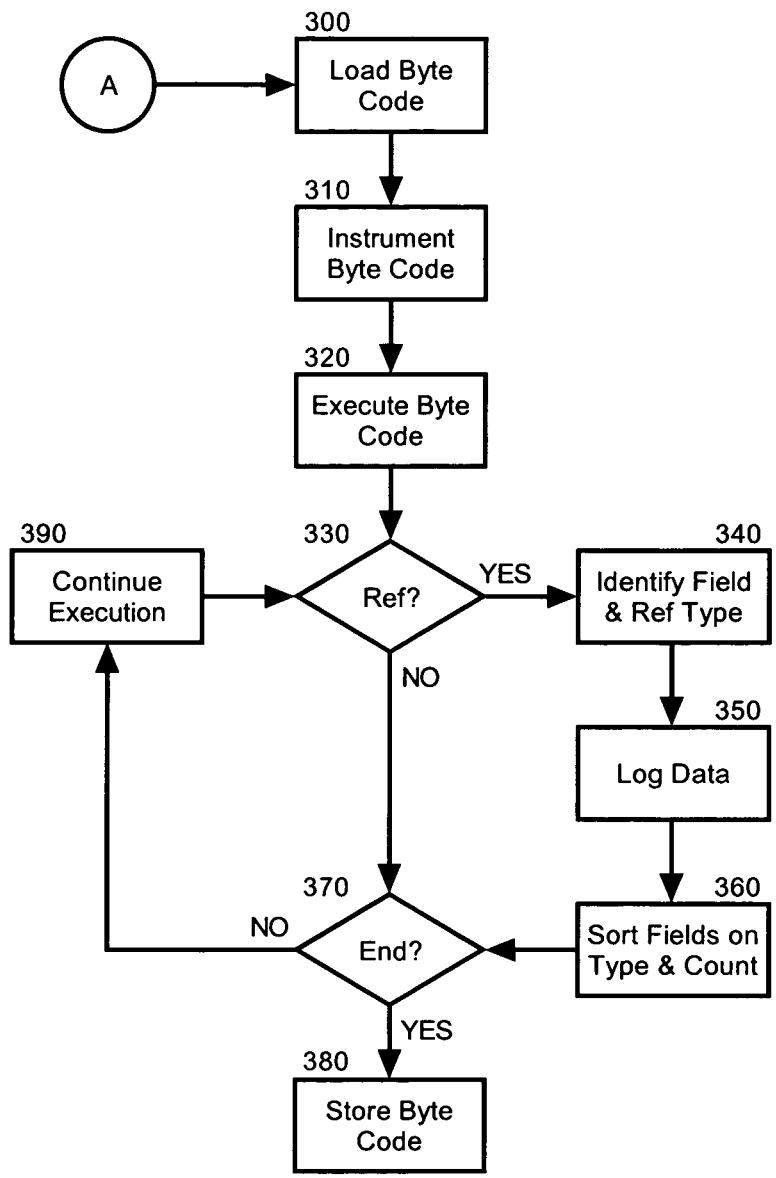

In this regard, FIG. 3 is a flow chart illustrating a process for dynamically analyzing and re-configuring an object for cache co-location in the system of FIG. 1. Continuing through jump circle A to block 300, the byte code of one or more classes can be loaded for execution in an execution environment. In block 310, the byte code can be instrumented to support a dynamic analysis of field accesses. Subsequently, in block 320 the byte code can be executed for the classes. In decision block 330, when a field is accessed, in block 340 the field can be identified as can the reference type. In block 350 the data for field access and access type can be recorded in a log and in block 360 the fields can be sorted based upon access count and type.

If in decision block 370 the execution of the classes has not ended, in block 390 the execution of the classes can continue and the next reference can be identified and processed in blocks 330 through 360. Once the execution of the classes has ended, in block 380, the byte code can be rearranged according to the sort and the modified byte code can be persisted for each class object. Still, it will be recognized by the skilled artisan that the process for implementing the dynamic analysis is not limited strictly to the flow shown in FIG. 3. Rather, the skilled artisan will recognize several other alternative flows, including a flow where sorting is not performed until the execution of the class objects has been completed. Moreover, the monitoring and rearrangement of the class objects can be performed individually and separately for each class object without regard for the operation of others of the class objects.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for grouping data fields in an object for optimal cache co-location, the method comprising the steps of:
counting a frequency of access for individual fields in the object in a static analysis;
rearranging said individual fields in the object based upon said counted frequency in said static analysis; executing the object;
further counting a frequency of access for said individual fields in the object in a dynamic analysis;
further rearranging said individual fields in the object based upon said counted frequency in said dynamic analysis;
identifying access types for said individual fields in said static analysis; and, performing said rearranging step based both upon said counted frequency in said static analysis and also upon said access types in said static analysis.

2. The method of claim 1, further comprising the steps of:
identifying access types for said individual fields in said dynamic analysis; and, performing said further rearranging step based both upon said counted frequency in said dynamic analysis and also upon said access types in said dynamic analysis.

3. The method of claim 2, wherein said further counting step comprises the steps of:
instrumenting the object to detect attempts to access said individual fields; and, determining an access count for each of said individual fields based upon data collected through said instrumentation.

4. The method of claim 1, wherein said counting step comprises the steps of:
generating a call graph for the object based upon internal and external references to said individual fields in the object in said static analysis; and,
determining an access count for each of said individual fields based upon said call graph.

5. The method of claim 1, wherein said further counting step comprises the steps of:
instrumenting the object to detect attempts to access said individual fields; and,
determining an access count for each of said individual fields based upon data collected through said instrumentation.

6. An object field co-location system for grouping data fields in an object for optimal cache co-location comprising:
a static analysis processor configured to rearrange fields in an object based upon a statically determined frequency of access for said fields; and,
a dynamic analysis processor configured to rearrange fields in an object based upon a dynamically determined frequency of access for said fields, wherein
said static analysis processor comprises programming for rearranging said fields in said object based firstly upon a type of access for said fields and based secondly upon a frequency of access for said fields.

7. The system of claim 6, wherein said dynamic analysis processor comprises programming for rearranging said fields in said object based firstly upon a type of access for said fields and based secondly upon a frequency of access for said fields.

8. A non-transitory machine readable storage medium having stored thereon a computer program for grouping data fields in an object for optimal cache co-location, the computer program comprising a routine set of instructions which when executed by a machine cause the machine to perform the steps of:
counting a frequency of access for individual fields in the object in a static analysis;
rearranging said individual fields in the object based upon said counted frequency in said static analysis; executing the object;
further counting a frequency of access for said individual fields in the object in a dynamic analysis;
further rearranging said individual fields in the object based upon said counted frequency in said dynamic analysis;
identifying access types for said individual fields in said static analysis; and, performing said rearranging step based both upon said counted frequency in said static analysis and also upon said access types in said static analysis.

9. The non-transitory machine readable storage of claim 8, further comprising instructions for causing the machine to perform the steps of:
identifying access types for said individual fields in said dynamic analysis; and, performing said further rearranging step based both upon said counted frequency in said dynamic analysis and also upon said access types in said dynamic analysis.

10. The non-transitory machine readable storage of claim 9, wherein said further counting step comprises the steps of:
instrumenting the object to detect attempts to access said individual fields; and,
determining an access count for each of said individual fields based upon data collected through said instrumentation.

11. The non-transitory machine readable storage of claim 8, wherein said counting step comprises the steps of:
generating a call graph for the object based upon internal and external references to said individual fields in the object in said static analysis; and,
determining an access count for each of said individual fields based upon said call graph.

12. The non-transitory machine readable storage of claim 8, wherein said further counting step comprises the steps of:
instrumenting the object to detect attempts to access said individual fields; and,
determining an access count for each of said individual fields based upon data collected through said instrumentation.

* * * * *